Jan. 13, 1970    C. D. STRANG    3,489,120

STEERING ARRANGEMENT FOR SLANT STERN DRIVE

Filed March 24, 1967      3 Sheets-Sheet 2

INVENTOR
CHARLES D. STRANG

BY
Wheeler, Wheeler, House & Clemency
ATTORNEYS

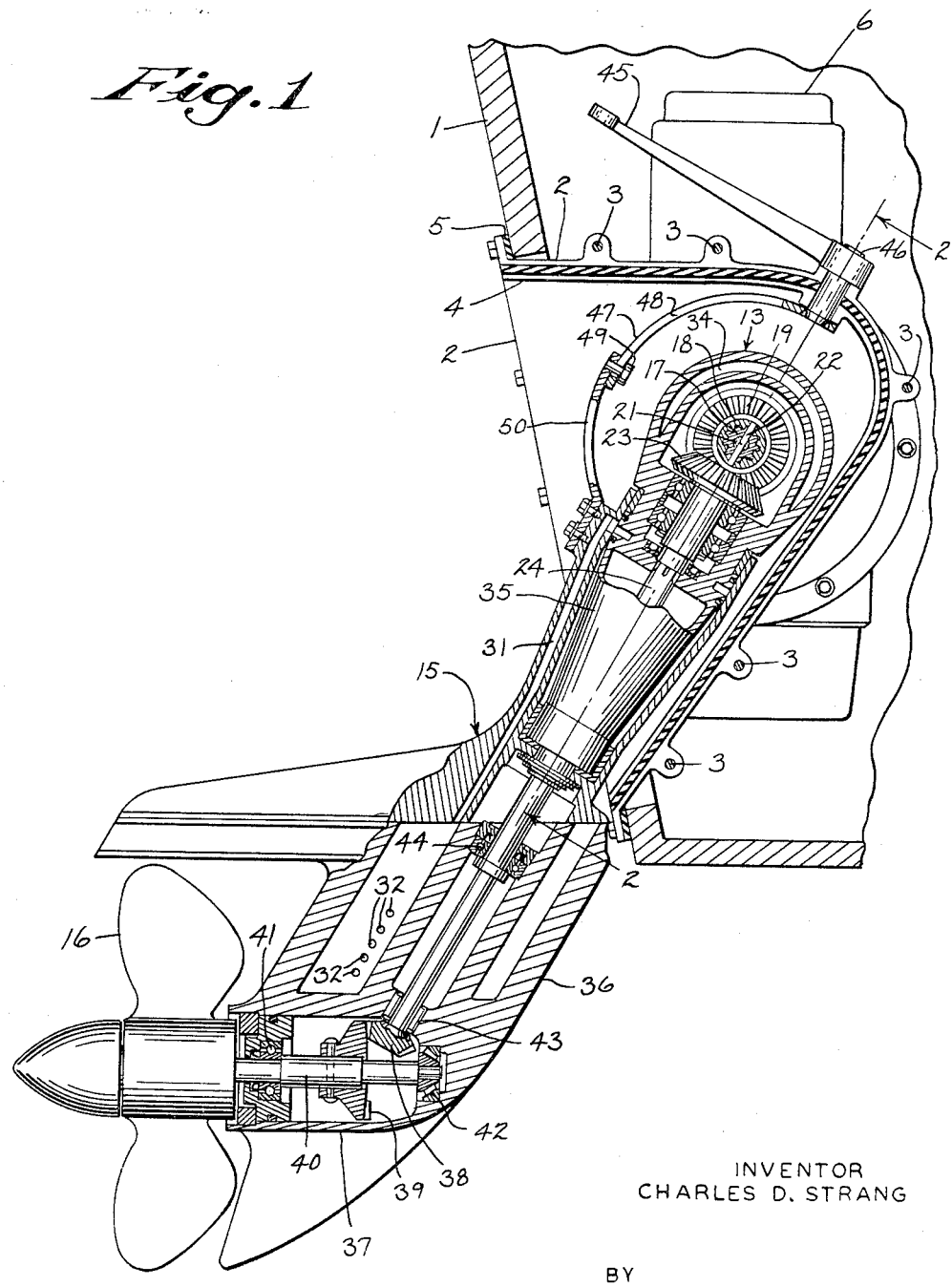

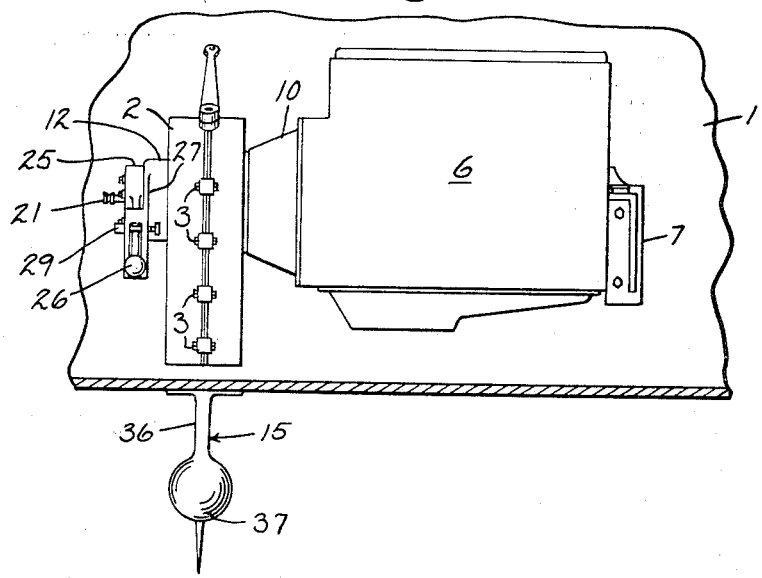
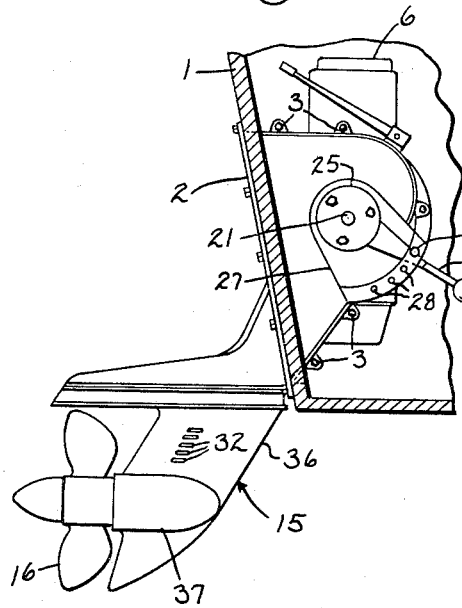
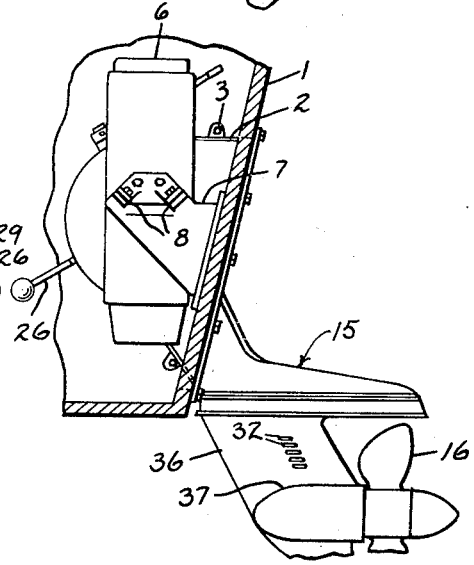

United States Patent Office 3,489,120
Patented Jan. 13, 1970

3,489,120
STEERING ARRANGEMENT FOR SLANT STERN DRIVE
Charles D. Strang, Waukegan, Ill., assignor to Outboard Marine Corporation, Waukegan, Ill., a corporation of Delaware
Filed Mar. 24, 1967, Ser. No. 625,689
Int. Cl. B63b 25/42, 5/12, 1/14
U.S. Cl. 115—41                                          18 Claims

ABSTRACT OF THE DISCLOSURE

Disclosed herein is a tilting mechanism for a marine propulsion device including a vertically tiltable lower unit which is dirigible about a rearwardly oblique axis. The steering mechanism is designed with a vertical lost motion mechanism or connection so as to enable steering regardless of vertical tilting of the lower unit. Also disclosed herein is a stern drive arrangement including a lever extending interiorly of a boat for tilting a lower unit.

BACKGROUND OF THE INVENTION

Figure 2:
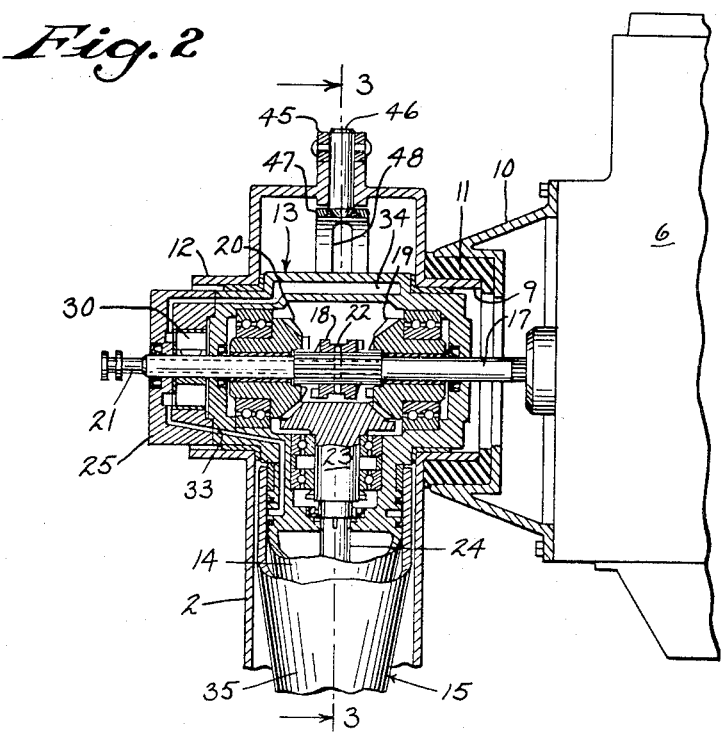

Various arrangements have been known for steering vertically tiltable lower units. In some prior arrangements, steering control is rendered inoperable in response to tilting of the lower unit from its normal operating position (see for example U.S. Patent No. 1,980,685). In other instances, cables with springs to accommodate lower unit tilting movement were provided (see for example U.S. Patent Nos. 2,946,306 and 3,083,678).

SUMMARY OF THE INVENTION

The invention disclosed herein is directed to a steering control which is connected to the steerable portion of the lower unit by means including a connection affording vertical lost motion. In the disclosed construction, the steering handle or tiller is pivotally mounted for steering operation about an axis extending radially of the lower unit tilting axis and the lost motion connection is provided by a pair of elongated arms or brackets which extend at a generally uniform radius from the horizontal tilt axis. One of the arms is provided with a lengthwise slot and the other arm includes a follower received in the slot whereby to accommodate continuing steering control regardless of vertical tilting of the lower unit.

The invention disclosed herewith also provides a marine propulsion device having a housing mounted on one side of a casing part for pivotal movement about a horizontal axis extending through the casing part. The housing also includes portion or part extending through the casing part along the axis to the other side of the casing part and has a lever on the housing portion on the other side of the casing for pivotally moving the housing and a connected dirigible unit about the horizontal axis The invention also involves the structure generally referred to in the preceding paragraph together with means located in the boat hull and including a member on the housing part or portion for selectively establishing the angular position of the housing relative to the boat hull.

The invention further provides a boat hull having a transom with an aperature therein, together with a casing mounted on said transom and extending into the boat hull. Mounted in the casing is a housing which is pivotable about a horizontal axis. In addition, a power shaft extends from a power source concentrically with the horizontal axis, and a propulsion leg extends from the housing in perpendicular relation to the horizontal axis and in rearwardly and downwardly inclined relation from the boat hull.

Still further the invention provides a housing rotatably mounted by a support about a first axis with the housing including a leg extending in perpendicular relationship to the first axis. In addition, a power unit is connected to the leg for pivotal movement relative to the leg about a second axis perpendicular to the first avis. In this regard, the unit extends completely around at least a part of the outer periphery of the housing leg, and there is provided means for pivoting the unit relative to the leg during pivotal movement of the housing about the first axis.

Also in accordance with the invention, there is provided a lever which is connected with the tiltable lower unit of the stern drive unit and which extends interiorly of the boat hull to readily afford manual lower unit tilting.

Other objects and advantages of the invention will become known by reference to the following description and accompanying drawings.

DRAWINGS

FIG. 1 is a side view with parts broken away and in section of a stern drive embodying the invention mounted on the stern transom of a boat, FIG. 2 is a fragmentary view of the stern drive taken on the plane 2—2 shown in FIG. 1, FIG. 3 is a view of the stern drive on a reduced scale as seen from within the boat and looking aft, FIG. 4 is a starboard side view of the stern drive as viewed from within the boat, a part of the boat being in cross section, and FIG. 5 is a port side view of the stern drive as seen from within the boat, a part of the boat being in cross section.

GENERAL DESCRIPTION

Fragmentarily shown in the drawings is a boat having a stern transom 1. An opening is cut in the transom 1 at its center to receive a metal well casing 2 that projects inboard and is open to the outside of the boat at its rear to thereby define a recess. The casing 2 is comprised of two halves which respectively include a side wall and which are clamped to each other about their periphery by a series of bolts 3 and with a watertight gasket 4 held therebetween so as to locate said side walls in opposing relation. A flange 5 that extends about the open rear of the well casing 2 provides for attachment to the transom 1 with a watertight fit.

As principally shown in FIG. 3, an inboard engine 6 is mounted on the port side of the well casing 2, and as seen in both FIGS. 3 and 5 a bracket 7 secured to the inboard face of the transom 1 supports one end of the engine 6 through a pair of resilient cushion mounts 8 that are set at ninety degrees to one another. This dampens engine vibration transmission to the boat hull. As seen in FIG. 2, the opposite end of the engine 6 comprises a conical end bell 10 that is mounted upon a circular part of flange 9 formed as a part of the well casing 2. An annular resilient cushion 11 is sandwiched between the flange 9 and the end bell 10 for dampening transmission of engine vibration. It is preferred that the resilient mountings for the engine 6 be disposed along the axis of least moment of inertia to thereby reduce transmission of vibrations to other parts of the boat, and general principles of engine mounting, as known in the art, may be followed for this purpose.

As shown in FIG. 2, the well casing 2 has a second circular part or flange 12 directly opposite the flange 9, and rotatably mounted in the flanges 9, 12 is an upper housing 13 that contains a transmission to be described hereinafter. As more clearly shown in FIG. 1, the upper housing 13 includes a downwardly extending, obliquely disposed inverted conical leg or shroud 14 upon which is mounted by suitable sleeve bearings a dirigible lower unit 15. The dirigible lower unit 15 surrounds the conical shroud 14 and continues downward therefrom below the hull of the boat at a rearward oblique angle. The dirigible unit 15 mounts a propeller 16 and contains suitable shafts and gearing for driving the propeller.

An input or power shaft 17 driven by the engine 6 and extending transverse of the vessel enters into the upper housing 13. This shaft is coaxial with the centers of the circular flanges 9, 12 and provides an axis about which the upper housing 13 and dirigible unit 15 may be pivoted in a fore and aft vertical plane. A shiftable dog clutch element 18 splined upon the shaft 17 can be moved axially of the shaft to engage either a forward driving gear 19 or a reverse driving gear 20, or the clutch element may be positioned in neutral, as shown in FIG. 2. Movement of the clutch element 18 is controlled through a clutch shaft 21 that is inserted through an axial opening in the input shaft 17 and joined to the clutch element 18 by a pin 22. The clutch shaft 21 is moved axially by appropriate mechanism that is not shown, and which is not a part of the present invention, but which is readily contrived within the skill of the art.

The driving gears 19 and 20 are mounted by suitable bearings within the upper housing 13, and are free to rotate with respect to the input shaft 17, when disengaged from the clutch element 18. The teeth of each of the gears 19, 20 is in engagement with a bevel gear 23 at the upper end of a rotatable drive shaft 24. The drive shaft 24 extends downwardly through and is co-axial with the conical shroud 14 of the upper housing 13. It also provides the turning axis for the dirigible lower unit 15.

As shown in FIGS. 2, 3 and 4, the starboard side of the upper housing 13 has a part or portion in the form of a water pump housing 25 bolted thereto, as an integral part thereof, which pump extends outward through the circular flange 12. The part, portion, or water pump housing 25 includes a handle 26, seen in FIGS. 3–5, which can be moved manually to pivot the entire upper housing 13 about the axis coincident with the center of the input shaft 17. An adjustment bracket 27, that is a part of the circular flange 12, is associated with the manual handle 26. As seen in FIG. 4, the bracket 27 has a series of apertures 28 that receive a pin 29, and by insertion of the pin 29 within the appropriate aperture 28 the position of the manual handle 26 may be controlled. Hence, the position of tilt of the upper housing 13 can be selected and the elevation of the dirigible unit 15 is accordingly adjusted from within the interior of the boat. In the drawings the dirigible unit 15 is shown in its lowermost position, and as the handle 26 is depressed, from the position shown in FIGS. 3–5, the dirigible unit 15 will be raised to the elevation desired. As this elevation takes place the bevel gear 23 and the driving gears 19, 20 slide about the input shaft 17, so that there is no resistance to the tilting motion. In this manner, the dirigible unit 15 may be elevated out of the water, or may be disposed at a desired angle with respect to the boat for optimum performance during operation. Further, if the dirigible unit 15 strikes a submerged object during operation it is free to elevate to reduce the likelihood of damage to the apparatus.

The upper housing 13 may also have a catch, operated by the axial movement of the shaft 21, that restrains tilting of the upper housing 13 when the clutch element 18 is moved into reverse. This will maintain the propeller 16 in position when the boat is reversed, and mechanisms of this nature are well known in the art.

Within the water pump housing 25 is a pump impeller 30 (shown in FIG. 2) that draws water upward through a duct 31 (shown in FIG. 1) in the dirigible unit 15 from a series of ports 32. The duct 31 leads to a duct 33 within the upper housing 13, and then from the pressure side of the pump impeller 30 water is forced into a cooling jacket 34, shown in both FIGS. 1 and 2, that partially surrounds the gears 19, 20 and 23 within the upper housing 13. Suitable water discharge ducts, not shown or a part of the present invention, are also provided, and fittings may also be provided for conducting water to the engine cooling system. The discharge of engine water can then be through the engine exhaust, all within the skill of the art.

The upper part of the dirigible unit 15 comprises a conical casing 35 that closely surrounds the conical shroud 14 of the upper housing 13. The casing 35 is mounted by suitable bearings to allow free rotation of the entire dirigible unit 15, and from the conical casing 35 the dirigible unit 15 extends downwardly into a submersible section 36 that includes a propeller gear housing 37 from which the propeller 16 extends. The drive shaft 24 extends downwardly through the submersible section 36 into the propeller gear housing 37, where it terminates in a drive shaft output gear in the form of a pinion 38. The pinion 38 is in mesh with a propeller shaft gear mounted upon a propeller shaft 40 for delivering power to the propeller 16. The propeller shaft 40 is supported in the dirigible unit 15 by a ball bearing 41 and a thrust bearing 42 at its forward end. The drive shaft 24 is also supported within the dirigible unit 15 by a lower roller bearing 43 immediately above the pinion 38 and a bearing 44 disposed a short distance beneath the point where the shaft 24 emerges from the shroud 14 of the upper housing 13.

In accordance with the invention, there is shown in each of FIGS. 1–5 a steering tiller 45 is obliquely mounted atop the well casing 2 within the boat. This tiller 45 has a rotatable mounting pin 46 which is coaxial with the center of turning of the dirigible unit 15 which is normal to the input shaft, and which is turned by movement of the tiller 45. The pin 46 extends through the well casing 2 and mounts an arcuate (as seen in FIG. 1) turning bracket 47. As particularly shown in FIG. 1, the arcuate curve of the bracket 47 has a center coincident with the center of the input shaft 17, and the bracket 47 also has a lengthwise slot 48 extending over the major portion of its length. Received within the slot 48 is a headed stud 49 fastened at one end of an arcuate turning arm or level 50 bolted at its opposite end to the after side of the dirigible unit 15. The arc of the turning arm 50 is a continuation of the curve of the turning bracket 47, and as is readily understood from the drawings when the tiller 45 is turned the dirigible unit 15 is similarly turned to direct the propeller thrust in desired direction for steering the boat. Upon the dirigible unit 15 being elevated, either manually by the handle 26 or upon striking a submerged object, the stud 49 will ride in the slot 48 of the turning bracket 47 to accommodate the relative motion between the dirigible unit 15 and the bracket 47.

The steering mechanism may be connected into any convenient remote control apparatus by suitable connection with the upper end of the steering tiller 45, and a rugged, direct acting steering mechanism of simple construction is provided in combination with a tiltable dirigible unit. The steering mechanism has a lost motion connection to accommodate tilting, and in the particular form shown this is accomplished by the use of an arcuate bracket and an arcuate lever that may overlap one another as the dirigible unit is raised. These arcuate members have a center of curvature at the center of turning of the tiltable dirigible unit 15 and the supporting housing 13, and they are connected to one another at all times.

By providing a transverse input shaft as illustrated in FIGS. 1–5, there need be no disconnect from the engine as tilt of the dirigible unit occurs, so no power loss occurs as submerged objects momentarily raise the dirigible unit. Also, the novel steering mechanism shown ensures constant control of propeller direction at all times.

Reversing can be accomplished by 180° rotation of the steering tiller 45, as well as by shifting the clutch 18. When this is done the propeller 16 faces upwardly, and rearwardly, so that the stern is elevated as reverse takes place. Swamping action, as takes place in other boat drives, is thus minimized.

The invention is not only applicable for use with inboard engines, but also with outboard engines. A large engine can be mounted upon a transom in a stationary position, and a dirigible unit that turns separate from the engine, for purposes of steering, can be disposed beneath the engine.

Various of the features of the invention aer set forth in the following claims.

What is claimed is:

1. In a marine propulsion device including a mounting casing having a recess open to the outboard side of a boat, an upper housing mounted in said casing recess for pivotal movement about a substantially horizontal tilting axis, and a dirigible unit secured to said upper housing, the improvement comprising the combination therewith of a steering tiller supported by said casing outwardly of said recess, a bracket extending in said recess and attached to said tiller to be turned thereby, an arm extending in said recess and attached to said dirigible unit, and a connection affording lost motion between said bracket and said arm.

2. A boat propulsion device in accordance with claim 1 including, a power shaft extending coaxially with said tilting axis, a drive shaft supported in said upper housing in perpendicular relation to said power shaft and extending downward therefrom, and gearing within said upper housing for connecting said power shaft with said drive shaft notwithstanding tilting of said drive shaft with said upper housing.

3. A boat propulsion device in accordance with claim 2 wherein said dirigible unit is mounted for rotation about said drive shaft.

4. A boat propulsion device in accordance with claim 2 wherein said bracket is substantially concentric with said axis and mounted for pivotal movement about an axis substantially normal to said power shaft, and wherein said arm is substantially concentric with said axis.

5. A marine propulsion device in accordance with claim 1 wherein said casing extends inwardly of the boat to provide a recess open to the outboard side of the boat and said upper housing includes a portion extending through said casing to the interior of the boat, and including a lever on said housing portion on the side of said casing interiorly of the boat for vertically tilting said upper housing and said dirigible unit.

6. In a marine propulsion device, the improvement comprising a casing extending inwardly of a boat to provide a recess open to the outboard side of the boat, an upper housing mounted in said casing for pivotal movement about generally horizontal axis, said housing extending rearwardly and outwardly from said casing and including a portion extending through said casing to the interior of the boat, a dirigible unit mounted on said upper housing, said dirigible unit including a propeller and propeller shaft, and a lever on said housing portion on the interior side of said casing for vertically tilting said upper housing and said dirigible unit.

7. A marine propulsion device in accordance with claim 6 wherein said casing includes opposing side walls, wherein said upper housing is pivotally mounted between said side walls and includes a power shaft extending within said casing transversely of said side walls, an engine mounted in said boat to one side of said casing in driving relation to said power shaft, a drive shaft carried by said upper housing and extending normal to said power shaft, reverse and forward driving gears rotatably mounted on said power shaft within said upper housing, a clutch between said power shaft and said reverse and forward gears, a clutch shaft extending through said power shaft from said casing at the side opposite from said engine, and a gear on said drive shaft in driving connection with said reverse and forward gears.

8. In a boat propulsion device the combination comprising a transom with a forwardly extending casing, an engine to the side of said casing resiliently mounted on mountings aligned substantially along the axis of least inertia, an input shaft extending from the engine transversely into said casing, an upper housing rotatably mounted about said input shaft for tilting motion in a vertical fore and aft plane and having a portion extending through the casing to the inboard side thereof, a tilt lever on said portion of said upper housing on the inboard side of said casing, a dirigible unit mounted upon said upper housing and having a lower gear housing, a rotatable drive shaft driven by said input shaft at its upper end extending downward through said dirigible unit into said gear housing, and a propeller shaft rotatably mounted in said gear housing with a propeller to the rear of the housing.

9. A marine propulsion drive comprising a boat having a transom with a casing providing a recess open to the outboard side of said boat, said recess extending forwardly inwardly into said boat and including opposing side walls, an engine mounted to one side of said casing on resilient mountings aligned substantially along the axis of least inertia and including an input shaft extending from said engine and transversely of said side walls and into said casing, an upper housing rotatably mounted about said input shaft for tilting movement in a vertical fore and aft plane and having a portion extending through one of said casing side walls to within said boat, a tilt lever on said portion of said upper housing and extending into said boat, reverse and forward driving gears within said upper housing on said input shaft, a clutch between said input shaft and said reverse and forward gears, a clutch shaft extending through said input shaft from said well casing side opposite from said engine, a drive shaft carried by said upper housing for tilting movement therewith and extending normal to said input shaft and downwardly therefrom, a driven gear on said drive shaft in driving connection with said driving reverse and forward gears for affording tilting of said drive shaft with said upper housing while maintaining meshed engagement of said driven gear and said driving gears, a dirigible unit mounted upon said upper housing for steering movement about the axis of said drive shaft and having a lower gear housing, a propeller shaft drivingly connected to said drive shaft and rotatably mounted in said gear housing, a propeller on said propeller shaft at the rear of said gear housing, a steering tiller supported by said casing for pivotal movement about an axis substantially normal to said input shaft, a bracket attached to said tiller to be turned thereby and being substantially concentric with said input shaft, an arm attached to said dirigible unit and extending substantially concentrically with said input shaft, and a connection affording pivotal lost motion between said bracket and said arm.

10. In a marine propulsion device, the combination of a mounting casing, a housing mounted on one side of said casing in partially spaced relation thereto for pivotal movement of said housing about a substantially horizontal tilting axis, a dirigible unit secured to said housing, a steering tiller supported by said casing on the other side thereof, a bracket extending on said one side of said casing in the space in said casing between said casing and said housing and attached to said tiller to be turned thereby, an arm extending on said one side of said casing and attached to said dirigible unit, and a connection affording lost motion between said bracket and said arm.

11. In a marine propulsion device, the combination of a casing having a part, a housing mounted on one side of said one casing part for pivotal movement about a generally horizontal axis extending through said one casing part, said housing including a portion extending through said casing part along said axis to the other side of said one casing part, a dirigible unit mounted on said housing and including a propeller and propeller shaft, and a lever on said housing portion on said other side of said casing for vertically tilting said housing and said dirigible unit.

12. The combination of a boat hull having a transom with an aperture therein and a marine propulsion device mounted on said boat hull and including a casing extending inwardly of said boat hull through said aperture in said transom, a housing rotatably mounted in said casing about a horizontal axis, said housing including a part thereof extending through said casing into the interior of said boat hull, and means located within said boat hull and including a member on said part of selectively establishing the angular position of said housing relative to said boat hull.

13. A combination according to claim 12 wherein said means for establishing the angular position of said housing relative to said boat hull includes a thrust pin engageable with said member, and means for selectively locating said thrust pin in an angular range about said horizontal axis.

14. A combination according to claim 12 wherein said means for establishing the angular position of said housing includes a handle extending from said part within said boat hull to facilitate angular adjustment of said housing relative to said boat hull.

15. The combination of a boat hull having a transom with an aperture wholely located therein, a casing mounted on said transom and extending into said boat hull, a housing mounted in said casing on the side thereof exterior of said boat hull for pivotal movement about a horizontal axis, power shafting extending from a power source through said casing concentrically with said axis, and a propulsion leg extending from said housing in perpendicular relation to said horizontal axis and in rearwardly and downwardly inclined relation from said boat hull.

16. A combination in accordance with claim 15 wherein said housing is substantially wholely located within said recess.

17. A combination according to claim 15 wherein said casing defines a recess located forwardly of said transom and open from the exterior of said boat hull.

18. The combination in a marine propulsion device of a support, a housing rotatably mounted by said support about a first axis, said housing including a leg extending in perpendicular relation to said first axis, a unit connected to said leg for pivotal movement about a second axis perpendicular to said first axis, said unit extending completely around at least a part of the outer periphery of said housing leg, and means for pivoting said unit relative to said leg during pivotal movement of said housing about said first axis.

References Cited

UNITED STATES PATENTS

| | | | |
|---|---|---|---|
| 2,946,306 | 7/1960 | Leipert | 115—35 |
| 3,051,198 | 8/1962 | Hamlyn et al. | 115—35 |
| 3,183,880 | 5/1965 | Schimanckas | 115—41 |
| 3,238,914 | 3/1966 | Swallow | 115—35 |
| 3,376,842 | 4/1968 | Wynne | 115—35 |
| 3,382,838 | 5/1968 | Bergstedt | 115—35 |
| 3,396,692 | 8/1968 | Bergstedt | 115—41 X |
| 3,396,693 | 8/1968 | Bergstedt | 115—41 |

TRYGVE M. BLIX, Primary Examiner

U.S. Cl. X.R.

115—35